US010386531B2

(12) United States Patent
Biterge et al.

(10) Patent No.: US 10,386,531 B2
(45) Date of Patent: Aug. 20, 2019

(54) GEOLOGICAL MODEL ANALYSIS INCORPORATING CROSS-WELL ELECTROMAGNETIC MEASUREMENTS

(71) Applicant: Schlumberger Technology Corporation, Sugar Land, TX (US)

(72) Inventors: Mustafa B. Biterge, Ankara (TR);
Muhammad Safdar, Lahore (PK);
Joseph Khoury, Abu Dhabi (AE);
Morten Kristensen, Auning (DK);
Michael Wilt, Walnut Creek, CA (US);
Pedro R. Navarre, Buenos Aires (AR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 453 days.

(21) Appl. No.: 13/791,826

(22) Filed: Mar. 8, 2013

(65) Prior Publication Data
US 2014/0257706 A1  Sep. 11, 2014

(51) Int. Cl.
*G01V 1/40* (2006.01)
*G01V 3/38* (2006.01)
(Continued)

(52) U.S. Cl.
CPC ............... *G01V 3/38* (2013.01); *G01V 1/301* (2013.01); *G01V 1/3808* (2013.01); *G01V 1/40* (2013.01);
(Continued)

(58) Field of Classification Search
CPC ... G01V 3/38; G01V 3/30; G01V 3/40; G01V 2210/612; G01V 2210/6122;
(Continued)

(56) References Cited

U.S. PATENT DOCUMENTS 5,886,255 A    3/1999 Aronstam
6,393,363 B1   5/2002 Wilt et al.
(Continued)

FOREIGN PATENT DOCUMENTS

WO    0201253 A1    1/2002

OTHER PUBLICATIONS

International Search Report and Written Opinion issued in PCT/US2014/020636 dated Jun. 2, 2014, 15 pages.

*Primary Examiner* — Sujoy K Kundu
*Assistant Examiner* — Lynda Dinh
(74) *Attorney, Agent, or Firm* — Sara K. M. Hinkley

(57) ABSTRACT

A method for geological formation analysis may include collecting time-lapsed well-based measurement data from a first borehole in a geological formation over a measurement time period, and collecting time-lapsed electromagnetic (EM) cross-well measurement data via a plurality of spaced-apart second boreholes in the geological formation over the measurement time period. The method may further include determining simulated changes to a hydrocarbon resource in the geological formation over the measurement time period based upon a geological model using a processor, and using the processor to determine if the simulated changes are within an error threshold of the time-lapsed well-based measurement data and the time-lapsed cross-well EM measurement data. If the simulated changes are not within the error threshold, then the geological model may be updated.

12 Claims, 8 Drawing Sheets

(51) Int. Cl.
*G01V 3/18* (2006.01)
*G01V 3/30* (2006.01)
*G01V 1/30* (2006.01)
*G01V 1/38* (2006.01)
*G01V 1/28* (2006.01)
*G01V 3/40* (2006.01)

(52) U.S. Cl.
CPC ............... *G01V 3/18* (2013.01); *G01V 1/282* (2013.01); *G01V 1/38* (2013.01); *G01V 3/40* (2013.01); *G01V 2210/56* (2013.01); *G01V 2210/66* (2013.01)

(58) Field of Classification Search
CPC ... G01V 2210/6161; G01V 2210/6163; G01V 2210/6244; G01V 2210/6246; G01V 3/3038; G01V 2210/6162; G01V 2210/624; G01V 1/28; G01V 3/306; G01V 1/40; G01V 1/301; G01V 1/282; G01V 1/3808; G01V 2210/56; G01V 2210/66; G01V 3/18

USPC ........................................................... 702/13
See application file for complete search history.

(56) References Cited

U.S. PATENT DOCUMENTS

| | | |
|---|---|---|
| 6,886,632 B2 | 5/2005 | Raghuraman et al. |
| 2006/0136135 A1 | 6/2006 | Little et al. |
| 2009/0043554 A1 | 2/2009 | Horne et al. |
| 2009/0150124 A1* | 6/2009 | Wilt .................. G01V 3/38 703/1 |
| 2009/0164188 A1* | 6/2009 | Habashy ............. E21B 43/00 703/10 |
| 2012/0014217 A1* | 1/2012 | Houck ................. G01V 11/00 367/72 |
| 2012/0191353 A1 | 7/2012 | Wilt et al. |

* cited by examiner

GEOLOGICAL MODEL ANALYSIS INCORPORATING CROSS-WELL ELECTROMAGNETIC MEASUREMENTS

BACKGROUND

Accurate assessment of fluid saturation distribution in a subterranean formation (often referred to as a reservoir) and its evolution over the life of a field is one of the principal jobs of oil and gas operators. This assessment uses inputs from multiple disciplines and integration of different and occasionally non-corroborating sources of information. A high degree of uncertainty permeates into the final assessment of distribution that may emanate from measurement errors, modeling gaps, interpretations, and a lack of detailed knowledge and characterization of the subterranean formation.

Integration of multiple data into a cogent predictive model of a reservoir may be problematic. The predictability of the reservoir model depends upon the level of integration to simulate the production and injection history of the reservoir. The process of making the reservoir model more predictive through its ability to match the history of the field is known as history matching. The history matching process is a continual process and often one of the primary functions performed by asset teams of the field operators. In some cases, the efforts from multi-disciplinary teams involved in the history matching process may span several years.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method for geological formation analysis may include collecting time-lapsed well-based measurement data from a first borehole in a geological formation over a measurement time period, and collecting time-lapsed electromagnetic (EM) cross-well measurement data via a plurality of spaced-apart second boreholes in the geological formation over the measurement time period. The method may further include determining simulated changes to a hydrocarbon resource in the geological formation over the measurement time period based upon a geological model using a processor, and using the processor to determine if the simulated changes are within an error threshold of the time-lapsed well-based measurement data and the time-lapsed cross-well measurement data. If the simulated changes are not within the error threshold, then the geological model may be updated.

A related system for geological formation analysis may include a plurality of borehole tools to collect time-lapsed well-based measurement data from a first borehole in a geological formation over a measurement time period, and to collect time-lapsed electromagnetic (EM) cross-well measurement data via a plurality of spaced-apart second boreholes in the geological formation over the measurement time period. A processor may also be included to determine simulated changes to a hydrocarbon resource in the geological formation over the measurement time period based upon a geological model, and determine if the simulated changes are within an error threshold of the time-lapsed well-based measurement data and the time-lapsed cross-well EM measurement data. If the simulated changes are not within the error threshold, then the geological model may be updated.

A related non-transitory computer-readable medium may have computer-executable instructions for causing a computer to determine simulated changes to a hydrocarbon resource in the geological formation over a measurement time period based upon a geological model, and determine if the simulated changes are within an error threshold of time-lapsed well-based measurement data and time-lapsed cross-well EM measurement data collected over the measurement time period. If the simulated changes are not within the error threshold, then the geological model may be updated.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a method and related system to facilitate history matching of a dynamic reservoir model using relevant traditional information in addition to time-lapse cross-well electromagnetic (EM) measurements is set forth herein. Time-lapse cross-well EM measurements bring in valuable information on temporal evolution of fluid saturation distribution within a portion of the reservoir.

By way of background, widely used industry-standard procedures exist to assess reservoir 3D fluid saturation distributions. Such procedures may include, for example, fluid distribution extrapolated in 3D derived from 1D borehole based measurements (e.g., pulsed neutron logs), fluid distribution extrapolated in 3D derived from point measurements (e.g., core data), and fluid distribution derived from 4D seismic (which may suffer from poor resolution). Other approaches may include fluid distribution simulated in 3D using reservoir simulators, and fluid distribution derived from thermal measurements.

Additionally, there have been recent attempts regarding estimation of formation properties in inter-well regions by monitoring saturation and salinity fronts. One such approach is set forth in U.S. Pat. No. 6,886,632 to Raghuraman et al., which is assigned to the present Assignee Schlumberger Technology Corporation, and is hereby incorporated herein in its entirety by reference. In accordance with this approach, the movement of at least one front in an inter-well region is monitored by providing a first well representing the origination of at least one front (such as a saturation front or a salinity front), providing one or more monitoring locations, each equipped with at least one sensor, and monitoring the arrival of at least one front at one or more monitoring locations. The origination well may be a permanent or temporary well, e.g., an injector well. Likewise, the monitoring location(s) may be a permanent or temporary well, such as an observation well, a production well, an exploratory well, or an appraisal well. Information regarding front arrival times may be used to characterize or appraise the formation. Front arrivals may be monitored as a function of time to develop their respective time evolution and shape.

Figure 1:
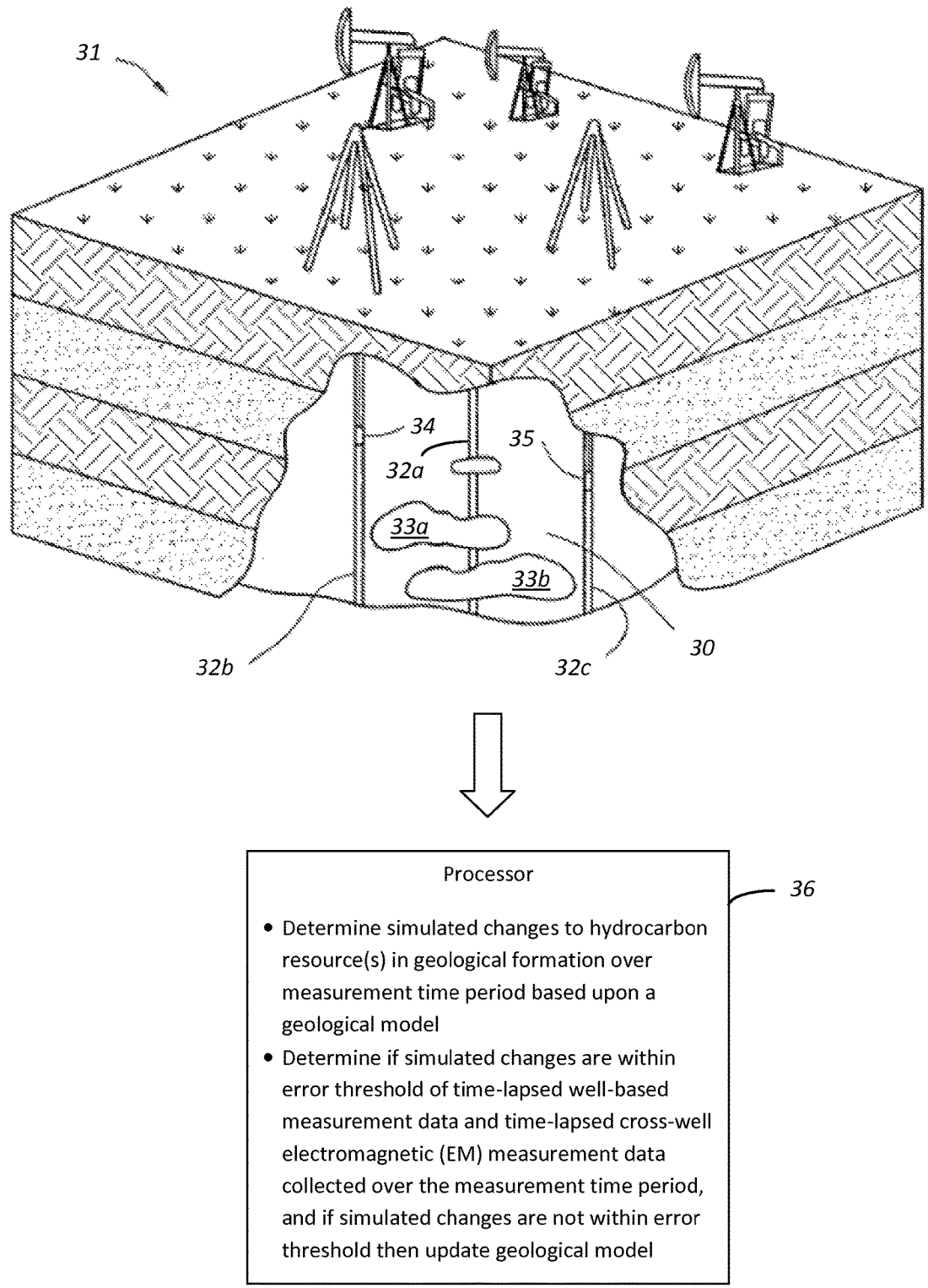
FIG. 1 is a schematic diagram of a system for use with a geological formation to provide geological model evaluation based upon cross-well EM analysis in accordance with an example embodiment.

Referring initially to FIG. 1, a geological formation 30 under analysis illustratively includes a plurality of boreholes 32a-32c, and a reservoir of resources of interests, in this example one or more reservoirs of hydrocarbons 33a, 33b. By way of example, the borehole 32a may be a production borehole through which hydrocarbon resources are extracted from the geological formation 30. A system 31 employed to analyze the geological formation may determine localized or well-based measurements of the geological formation 30 and reservoirs 33a, 33b using measurement tools such as X-ray or gamma ray spectroscopy devices, EM measurement devices, nuclear magnetic resonance (NMR) devices, etc. Moreover, such measurements may be performed during drilling, such as with a logging while drilling (LWD) or measurement while drilling (MWD) configuration, as well as with a wireline configuration, for example.

The system 31 may further include one or more EM transmitters 34 disposed within the borehole 32b in a first region of the geologic formation 30. In signal communication with the transmitter 34 is a signal generator (not shown), which may be located at the surface of the geological formation 30, for example. One or more EM receivers 35 are disposed in the borehole 32c. The transmitter 34 and receiver 35 may be deployed using standard seven conductor wireline winches, cables and standard seven-pin Gerhardt-Owens cable connectors, for example, although other suitable conveyance devices may also be used. The system 31 may be operated from a surface station that is in data communication with the transmitter 34 and receiver 35. Further, a transmitter may also be used in the borehole 32c to transmit to a receiver(s) in the borehole 32b, and more than two boreholes may be used for cross-well EM measurements, as will be discussed further below.

Magnetic fields may be generated by the transmitter 34 at various vertical levels above, within, and below an area of interest. The magnetic fields sensed by the receiver 35 are sensed at various vertical levels above, within, and below the area of interest. In accordance with an example EM measurement configuration, the transmitter 34 may be moved between fixed depth points within the borehole 32a at a rate of 3 to 5 meters/minute while transmitting signals. The receiver 35 remains at a fixed position in the borehole 32b while receiving the signals. After the transmitter 34 moves between the aforementioned fixed depth points, the receiver 35 may be positioned at a different depth within the borehole 32b, and the transmitter 34 again moves between different depths within the borehole 32a. A processor 36 may be used for perform simulation and analysis based upon the measured EM data, as will be discussed further below. By way of example, the processor may be implemented using a microprocessor and a non-transitory computer-readable medium or memory having computer-executable instructions for performing the various operations set forth herein, for example.

Further information on EM measurement techniques for measurement of electrical resistivity of geological formations and interpreting deep reading electromagnetic data is set forth in U.S. Pat. No. 6,393,363 to Wilt et al., which is assigned to the present Assignee and is hereby incorporated herein in its entirety by reference. A technique for interpreting deep reading electromagnetic data is set forth in U.S. Pub. No. 2012/0191353 to Wilt et al., which is also assigned to the present Assignee and is hereby incorporated herein in its entirety by reference.

The system 31 and methods set forth herein may advantageously be used to integrate such EM data measurement techniques into the reservoir characterization process through history matching. This approach involves incorporating time-lapse cross-well electromagnetic (EM) measurements into reservoir modeling and simulation software and systems. Integration of EM interpreted results to the reservoir characterization process may offer various applications to deep reading measurements. The present approach may provide integration of EM results to the history matching process to improve the reservoir characterization during dynamic modeling, and it may be used in the history matching process of legacy data. Inclusion of time lapse EM data into history matching may improve the understanding of flow paths, barriers, as well as lateral and vertical transmissibility, for example.

The present approach may automate the integration of the cross-well EM measurements into dynamic reservoir modeling, thereby allowing relatively quick and easy assessment of 3D reservoir time-lapse fluid saturation distributions in single as well as multi-layer heterogeneous reservoirs. Further to integration of cross-well EM measurements into dynamic reservoir models, the process may decrease uncertainty in reservoir characterizations. That is, the present approach may increase the accuracy of history matching methods and, consequently, introduce higher accuracy for the field development options through reservoir simulations. Additionally, integration into reservoir modeling and simulation software packages and systems allows the cross-well EM measurements to be combined with other dynamic reservoir data and models, as will be discussed further below, resulting in a more accurate assessment of hydrocarbon recovery and injection conformance.

Figure 2:
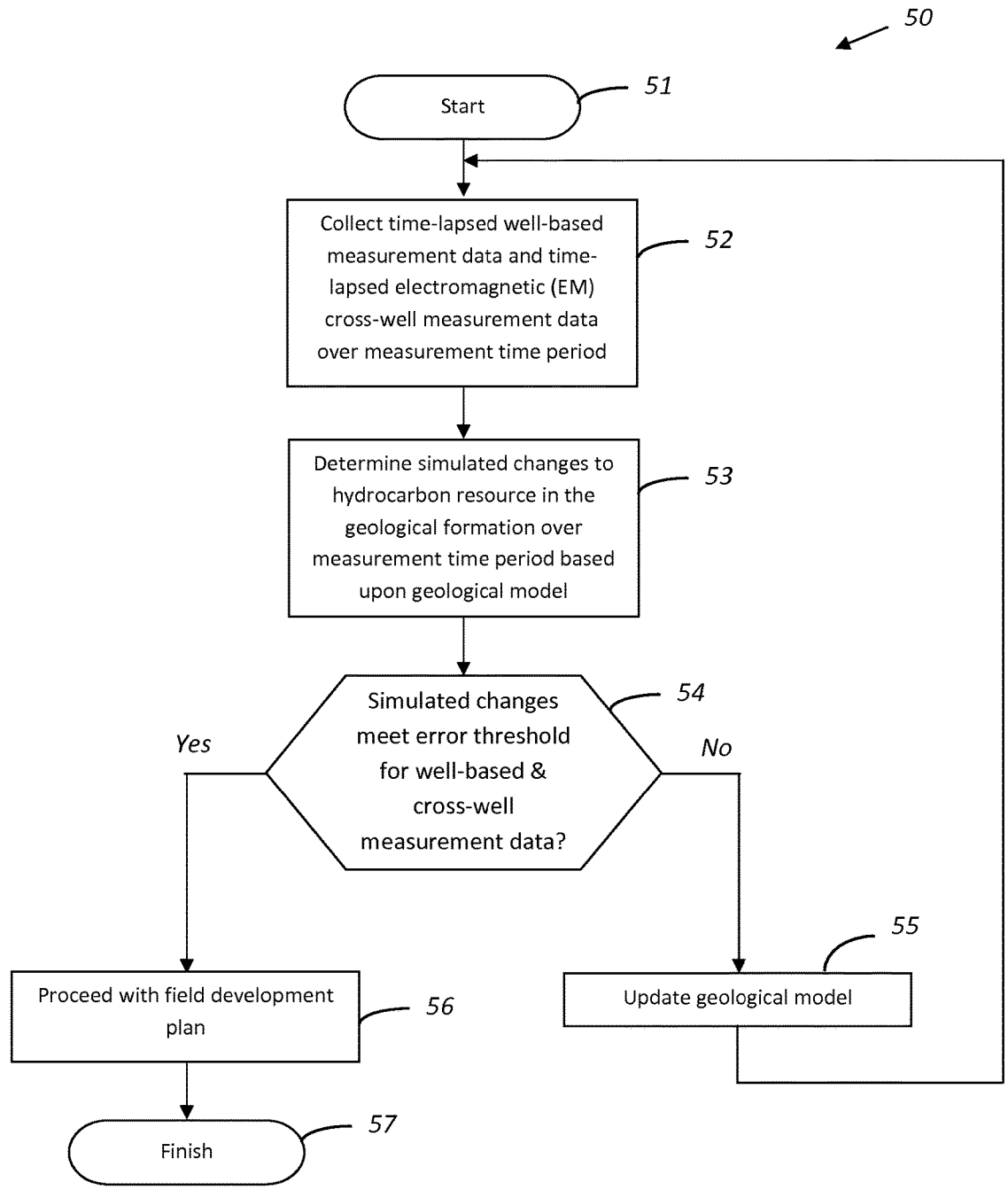
FIGS. 2 and 3 are flow charts illustrating example geological model evaluation method aspects.

Referring additionally to the flow diagram 50 of FIG. 2, beginning at Block 51, an example work flow using the above-noted approach illustratively includes collecting time-lapsed well-based measurement data and time-lapsed electromagnetic (EM) cross-well measurement data over a measurement time period, as discussed above (Block 52). Furthermore, simulated changes to the hydrocarbon resource(s) in the geological formation 30 may be determined over the measurement time period based upon geological model, at Block 53. The method may further include determining if the simulated changes are within an error threshold of the time-lapsed well-based measurement data and the time-lapsed cross-well measurement data, at Block 54. That is, history matching of the simulated changes not only encompasses localized or well-based measurement data collected from the production well 32a, but it also integrates the time-lapsed cross-well EM measurement data to help ensure that the geological model accounts for both near field and full field changes. If the simulated changes are not within the error threshold, then the geological model may be updated accordingly, at Block 55, as will be discussed further below. Otherwise, an operator may proceed with a current field development plan, for example, at Block 56, which illustratively concludes the method of FIG. 2 (at Block 57).

More particularly, the cross-well EM measurements may be integrated into a reservoir engineering workflow involving reservoir modeling and simulation software (e.g., Petrel E&P Software Platform and ECLIPSE 2012 Reservoir Engineering Software from Schlumberger Limited). Generally speaking, a reservoir model may include two main components, namely a static geological model and a dynamic reservoir model. The static geological model may incorporate data related to reservoir surfaces, tops, and thicknesses. The top reservoir surface may be derived from a constant value, interpolated from well markers, interpreted from seismic data, etc. The base reservoir surface may be derived from an offset from the top surface (constant or variable), a constant value, interpolated from well markers, interpreted from seismic data, etc.). Intra-reservoir surfaces may be derived as needed (similar to top and base surface sources). Furthermore, reservoir boundaries may be derived from bounding faults, pinch-outs, designated extent, etc.

Static geological models may further include reservoir properties derived from logs, geophysical inversion, geostatistical modeling, object modeling, layer cake modeling, constant values, etc. By way of example, these may include porosity, permeability, net/gross, lithofacies, etc. Other information which may be accounted for in the static geological model may include faults, fractures (derived from seismic, micro-seismic, core, thin-section, outcrop data, bore-hole logs, etc.), well locations and trajectories, rock-types distribution (which may be derived from transforms of lithofacies, porosity, permeability, etc.), and saturation distribution (which may be derived from core, logs, seismic data, or simulations).

With respect to dynamic reservoir models, these are based upon the static geological model but also account for other dynamic properties. For example, fluid properties may be determined using PVT Pro EOS software from Schlumberger Limited. That is, PVT modeling may be done using a thermodynamic simulator such as PVTi, PVT Pro, etc. Reservoir fluid characterization may also be incorporated in the dynamic model, such as formation volume factors, density, viscosity, PVT EoS, etc. which may be derived from correlations, laboratory testing, downhole fluid analysis, analogs, published data, etc. Rock physics characterization may also be included, such as relative permeability, capillary pressure, compaction, etc. These may be derived from correlations, laboratory testing, analogs, published data, etc.

Other information which may be incorporated in the dynamic model may include well completions and production/injection history (e.g., enhanced oil recovery (EOR) injection). Such information may include which wells are produced/injected and at what rate, injection type, fluid type, injection duration, under which controls and criteria, which oil recovery process (secondary, enhanced, etc.). Further information which may be included in the dynamic model includes static and dynamic pressure obtained from logs, pressure surveys, pressure sensors, etc.

By way of example, EOR techniques involve injecting of an agent that is different than the in situ reservoir fluid into the reservoir environment to displace a hydrocarbon. During the displacement process, the resistivity of the reservoir where agent contacts and pushes the hydrocarbon changes. Time-lapsed EM cross-well measurements identify the change in subsurface resistivity, and hence the displaced volume, through an enhanced oil recovery application. The present approach integrates the time-lapsed EM cross-well measurements from an enhanced oil recovery application to reservoir characterization to help improve relatively expensive EOR procedures.

The predictability of the reservoir model hinges upon the level of integration to simulate the production and injection history of the reservoir. The process of making the reservoir model more predictive through its ability to match the history is known as history matching. A general history matching process of a full-field model (FFM) in accordance with an example implementation may include building a static geological model (as discussed above), upscaling of the geological model to a dynamic model, initializing the dynamic reservoir model, and simulating the full-field model for the historical period. The historical period may be a period for which observed data and measurements are available, which may be on the order of several years, for example, although shorter time periods may be used in some applications. Furthermore, the history-match quality may be analyzed through a comparison of simulated results with observed data from the EM cross-well measurements. If an acceptable history-match is achieved, then the operator may desire to proceed with desired field development plans (FDP), but if the quality history-match is not achieved, then the dynamic reservoir model may be updated accordingly, as noted above. The process may be repeated until quality history-match is achieved.

Regarding cross-well EM measurements, electrical resistivity is a useful tool in formation evaluation of oil and gas reservoirs and is used in logging programs to evaluate near-well reservoir rocks and fluids. It may be desirable to extend this knowledge deeper into the formation to better characterize the reservoir away from the wells and thereby improve field management. This may be accomplished by applying tools that are sensitive to the inter-well environment. One of these tools is the DeepLook-EM inductive cross-well EM imaging tool from Schlumberger Limited, although other suitable EM measurement tools may also be used.

Cross-well electromagnetics is an induction-based tomography technology that inductively measures the inter-well resistivity between wells. This technology, which may be useful for tracking water and steam floods or mapping residual saturation, is also used to improve sweep efficiency, identify bypassed pay and predict fluid-related issues such as water breakthrough. As noted above, the acquisition strategy involves fixing a receiver(s) at a certain depth in one well, and acquiring data continuously in a second well with the transmitter sonde moving, as noted above. After a specified depth interval is logged the receiver(s) is moved to a new depth, and the process is repeated until the logging interval is covered by both source and receiver(s). A data point may be generated by stacking a monochromatic sine wave hundreds or thousands of times.

The physics behind this technology are basically the same as those of the borehole induction tools. The main difference is that the transmitter is set into one observation well, whereas the receivers are placed in a second well. The transmitter induces an electrical current into the formation that may be 100,000 times stronger than standard borehole induction tools, for example, to provide a magnetic field that is strong enough to propagate far enough into the formation to reach the second observation well, where the series of receivers are located. The electrical current from the transmitter creates a strong magnetic field (or primary magnetic field), which induces a current within the formation which, in turn, creates a secondary magnetic field. The receivers detect both, the direct field (primary field), which is insensitive to the formation resistivity, and the induced field (secondary field), which is sensitive to the formation resistivity and therefore contains the pertinent information. Once the tomography is completed, the resistivity distribution in the inter-well space may be determined by inversion using a 2D code. The inversion proceeds by modifying an initial resistivity model until observed and calculated data match within a specified tolerance, which may be determined by the measurement error. In some cases, a separate low frequency tomography is performed to recover accurate relative well geometry.

Figure 3:
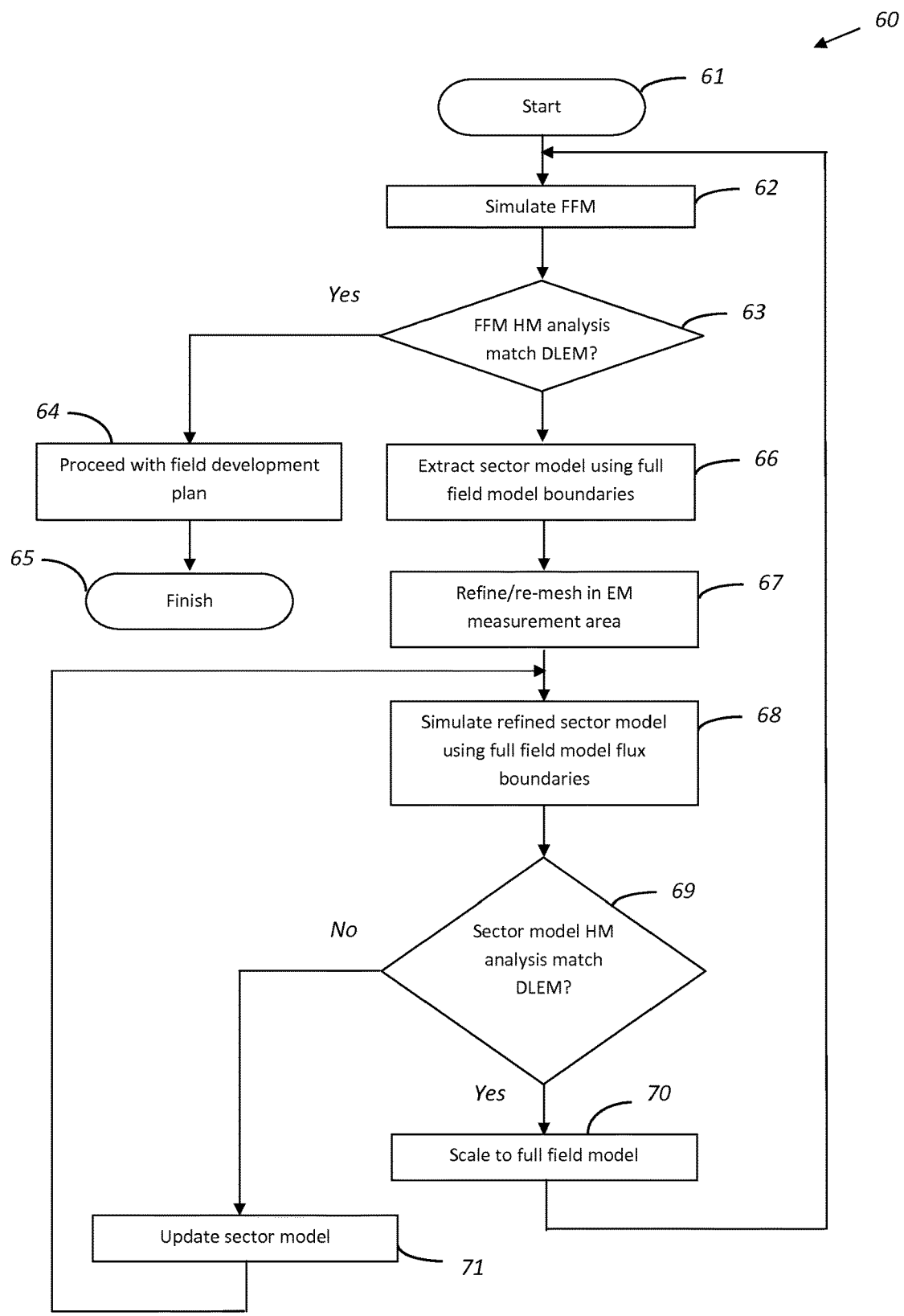

An example workflow for integrating time-lapse cross-well EM (e.g., DeepLook-EM (DLEM)) measurements into a dynamic reservoir simulation will now be further described with reference to the flow diagram 60 of FIG. 3. Beginning at Block 61, a full-field model (FFM) may be run under history-match mode and compared with the DLEM results to see if the desired accuracy level has been obtained, at Blocks 62-63. If so, the operator may desire to continue with the given field development plan, at Block 64, which concludes the illustrated method (Block 65).

Incorporation of DeepLook-EM information into the simulation work may be performed using a high definition grid model. This grid may be generated from the full-field model (FFM) either in the form of local grid refinement (LGR) or a sector model cut out or extracted from the FFM, at Block 66. The sector model may then be subdivided into a reasonably fine mesh, at Block 67. In accordance with one example case, a 100 m by 100 m FFM grid was reduced to an intermediate scale of 10 m by 10 m grid to accurately capture the water movement from injection well towards the production well, although other grid sizes or scales may also be used. Further details on grid refinement and property scaling are set forth below.

The simulation may involve generating fluxes as the boundary conditions to the sector model, at Block 68. The sector model may be generated from the FFM, and FFM fluxes may be assigned as the boundary conditions to the sector model. At Block 69, the accuracy of the FFM history matching may be checked for the various HM parameters, including time-lapse DeepLook-EM saturations and PNL profiles, for example. Optionally, in the event that further grid subdivisions are desired, a local grid refinement (LGR) may be generated for the focus area.

The accuracy check may involve history matching with the sector/LGR model, concentrating on matching the saturation profile observed with the time-lapse DeepLook-EM surveys. Upon completing the history match with sector/LGR model, if desired accuracy has been obtained then the grid properties may be scaled (e.g., upscaled) to update the FFM coarse grid, at Block 70, and the updated FFM may be run under history-match mode. FFM simulation with upscaled correction from LGR model may then be performed again. Otherwise, the sector model may be updated, at Block 71. The foregoing operations may be repeated until a reasonable FFM history match is achieved.

Upscaling and downscaling for cross-well electromagnetic (DeepLook-EM) measurements integration into a dynamic reservoir simulation will now be further described. A component of a workflow devised for DeepLook-EM integration is bringing the data and information of Deep-Look-EM surveys and simulation results to the same level, i.e., a same grid size. DeepLook-EM data is generally interpreted using a grid size of 5 m by 5 m. However, the full field model grid resolution may be much larger, e.g. 100 m. Depending on the total number of active simulation grid cells, the full field model grid size may be reduced. Iteration is performed on the grid size through the simulations, and an intermediate resolution may be obtained (e.g., 10 m by 10 m) such that the lateral grid resolution is accurate enough to mimic the DeepLook-EM interpretations, but coarse enough to allow practical computation times for the simulations. To reconcile the scale-issues without delimiting the accuracy, DeepLook-EM data may be upscaled, and the FFM simulation results may be downscaled using local-grid refinements (LGRs).

By way of example, an Archie equation may be utilized to convert DeepLook-EM resistivity data to saturations as follows:

$$S_w = \sqrt[n]{\frac{a}{\phi^m} \frac{R_w}{R_{DLEM}}}, \quad (1)$$

where $S_w$ is apparent water saturation, $\phi$ is porosity, $R_w$ is formation water resistivity ($\Omega$-m), $R_{DLEM}$ is inverted resistivity from DeepLook-EM ($\Omega$-m), n is a saturation-exponent, a is a constant, and m is a cementation factor. In the present example values of n=2, a=1, m=2 were used, and formation water resistivity was selected to be that of highly saline formation water. It should be noted that the Archie formula does not take into consideration the connate and/or "critical" hydrocarbon saturation. Therefore, Archie resistivity conversion assumes that the water saturation in a grid cell varies from 0 to 100%.

Figure 4:
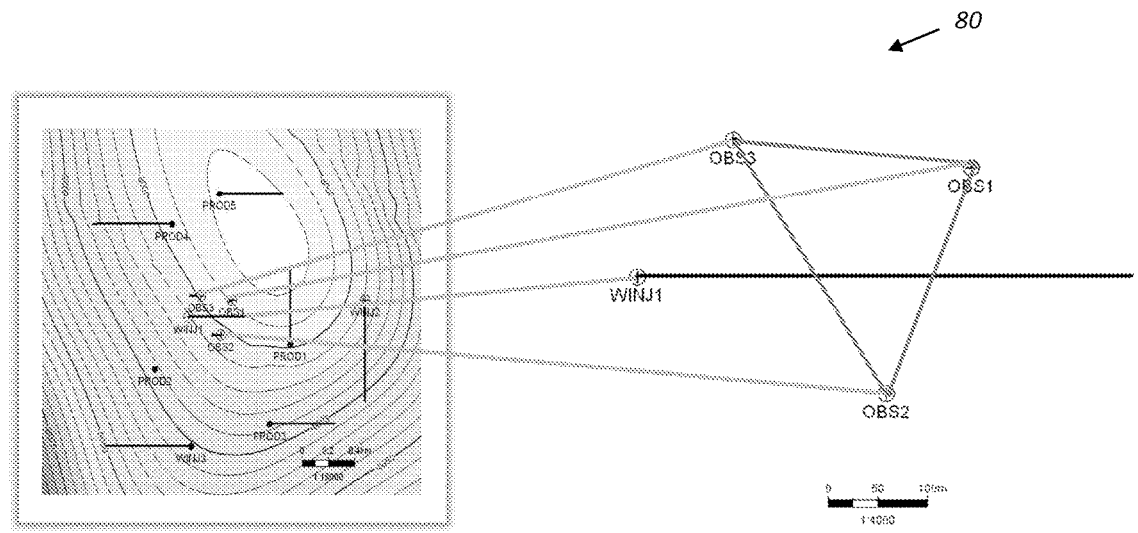
FIG. 4 is a map of a well site for which cross-well electromagnetic measurements were taken for use in a geological model evaluation in accordance with an example embodiment.

The foregoing will be further understood with reference to an example integration of time-lapse DeepLook-EM measurements into dynamic reservoir simulation using synthetic field data. A portion of the synthetic reservoir used in the example is shown in the map 80 of FIG. 4. Three observation wells OBS1-OBS3, where DeepLook-EM measurements have been acquired around a water injection well WINJ1, are displayed in the figure. The focus area encompasses the vicinity of water injection well (WINJ1) and the three observation wells (OBS1, OBS2 and OBS3), as shown.

Figure 5:
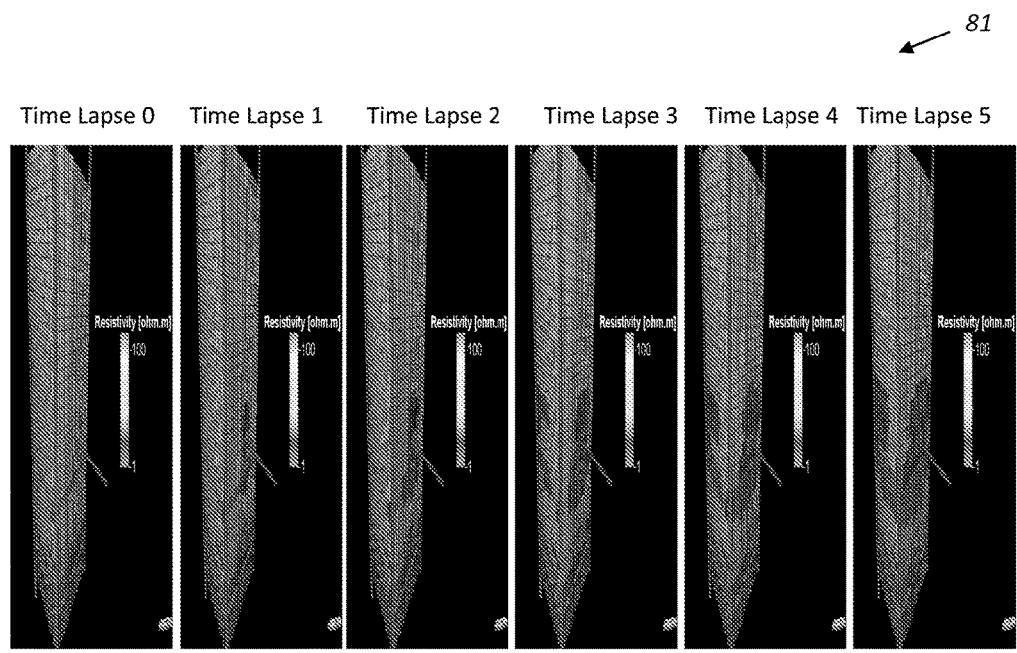
FIGS. 5-9 are a series of 3D views representing time-lapse EM cross-well measurements taken from the borehole locations shown in FIG. 4 as well as corresponding simulated results.
Figure 6:
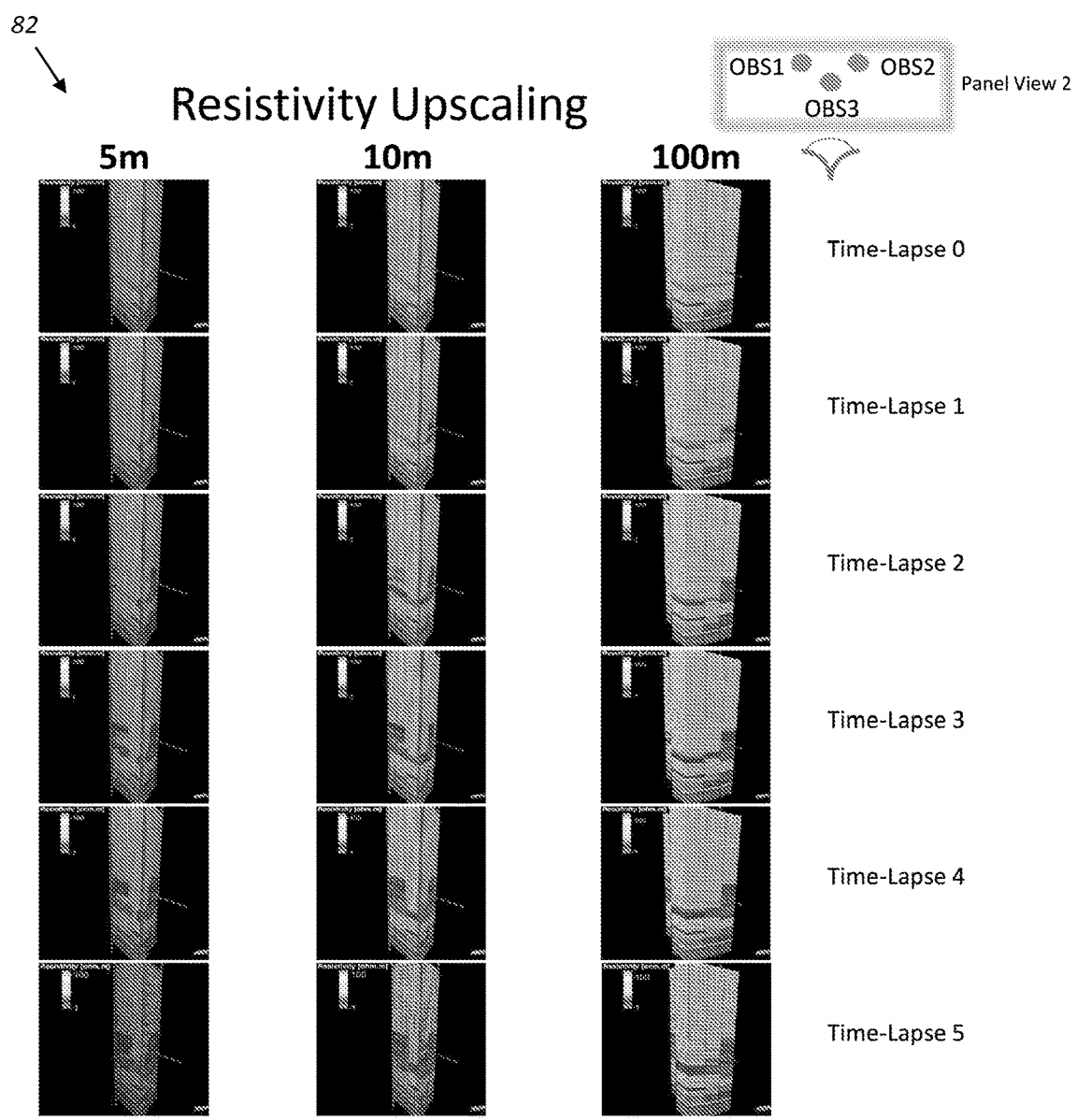

A series 81 of six time-lapse DeepLook-EM acquisitions, which are shown in FIG. 5, were used in the example. Upscaling of the resistivity profiles is shown by the series 82 of FIG. 6. Scale resolutions are 5 m, 10 m, and 100 m, as indicated. The resistivity scale is from 1 to 200 $\Omega$-m. In this example, an intermediate resolution of 10 m is chosen in which the DeepLook-EM integration will be performed. In the integration exercise, the aim is to replicate the time-lapse resistivity profiles interpreted from DeepLook-EM measurements between the water injection well WINJ1, the observation wells OBS1-OBS3, and production wells. Care may also be given to the well measurements, such as the time dependent pressure, borehole-based saturation profile (PNL), phase flow rates and GOR.

To perform history matching of well measurements (e.g., pressure, gas-oil ratio, and watercut), focus was placed on permeability and permeability anisotropy. In summary, the history matching effort was based on the following uncertain parameters: permeability (e.g., regional multipliers, layer-wise multipliers, well-wise multipliers); permeability anisotropy; rock-type distribution (e.g., vertical wettability gradient, wettability contrast, regional modification, well-wise modification; or a combination of these parameters).

Regional permeability was varied using multipliers in the range of 0.1 to 4. Lateral permeability anisotropy was varied by factors between 0.1 and 4. However, layer-wise modification factors considered were as high as 12 and as low as 0.02 to identify with high permeability streaks and flow baffles, respectively. As a result of several investigations and engineered iterations, it was found that combination of vertical permeability and rock-type mostly impacts the water movement in the focus area in accordance with observed DeepLook-EM time-lapse variations. To discern the value of DeepLook-EM, two history-match cases were considered, namely one that did not use DeepLook-EM derived saturation (HM case w/o DLEM), and the other using these saturation profiles (HM case w DLEM).

Figure 7:
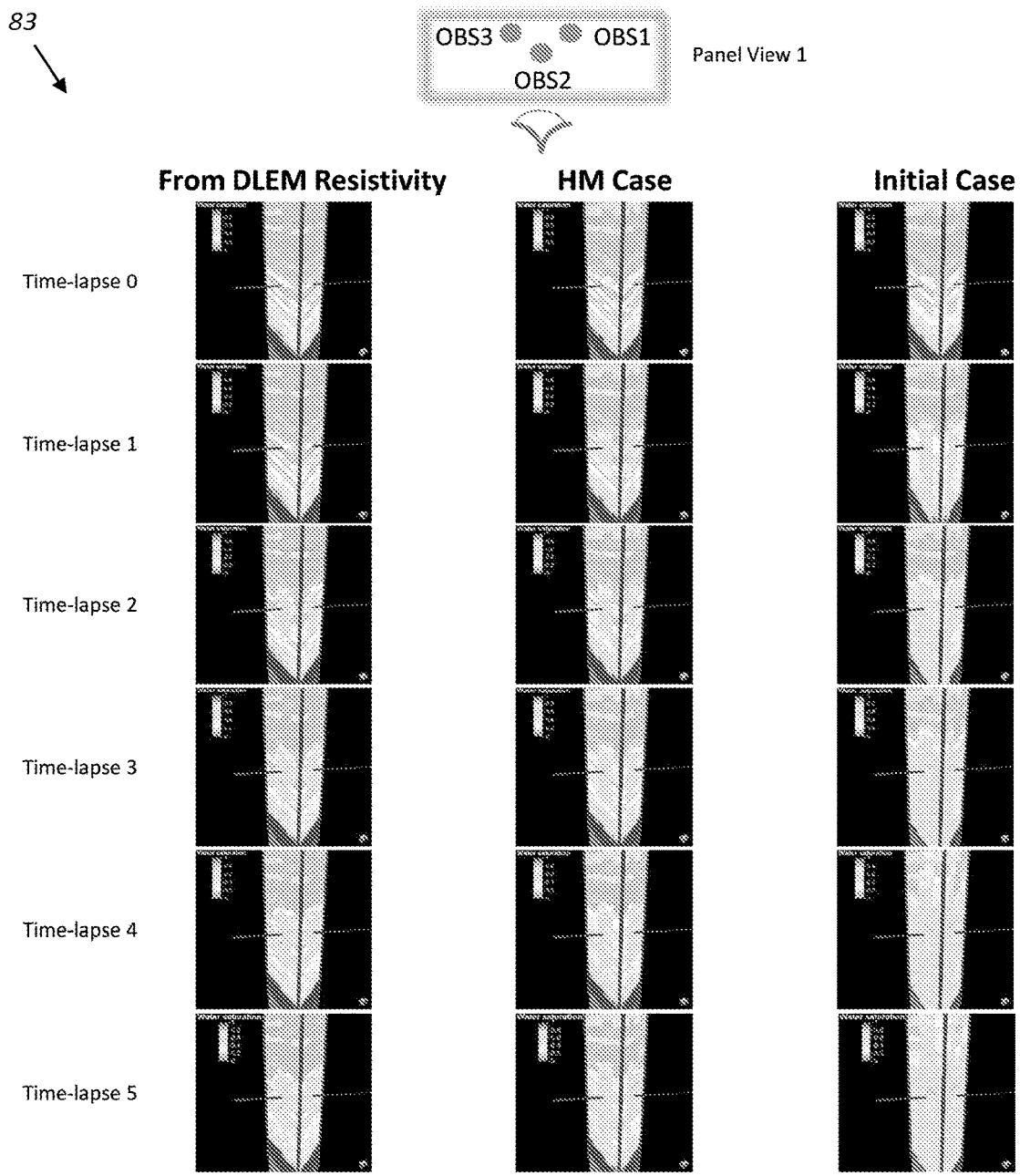
Figure 8:
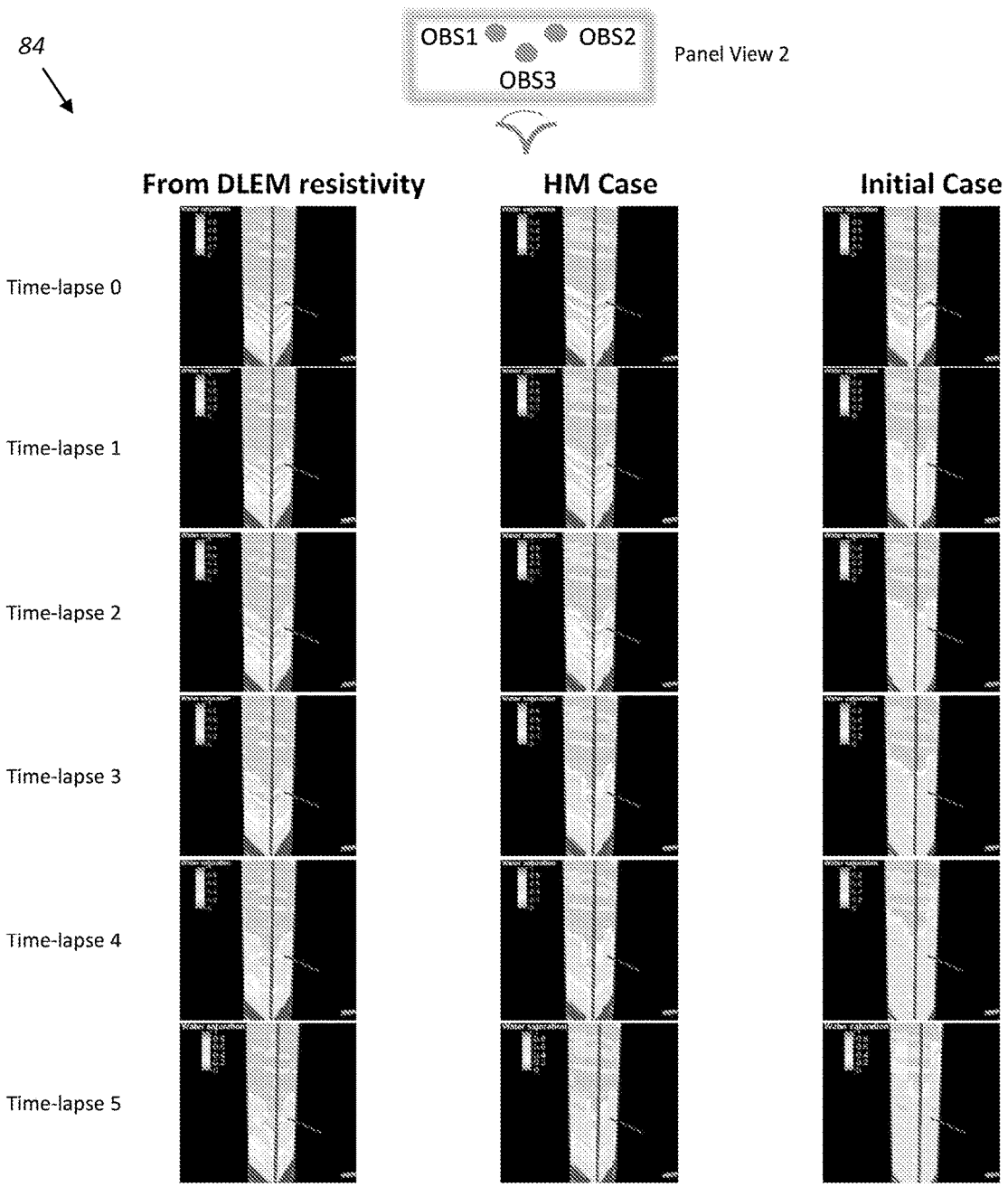
Figure 9:
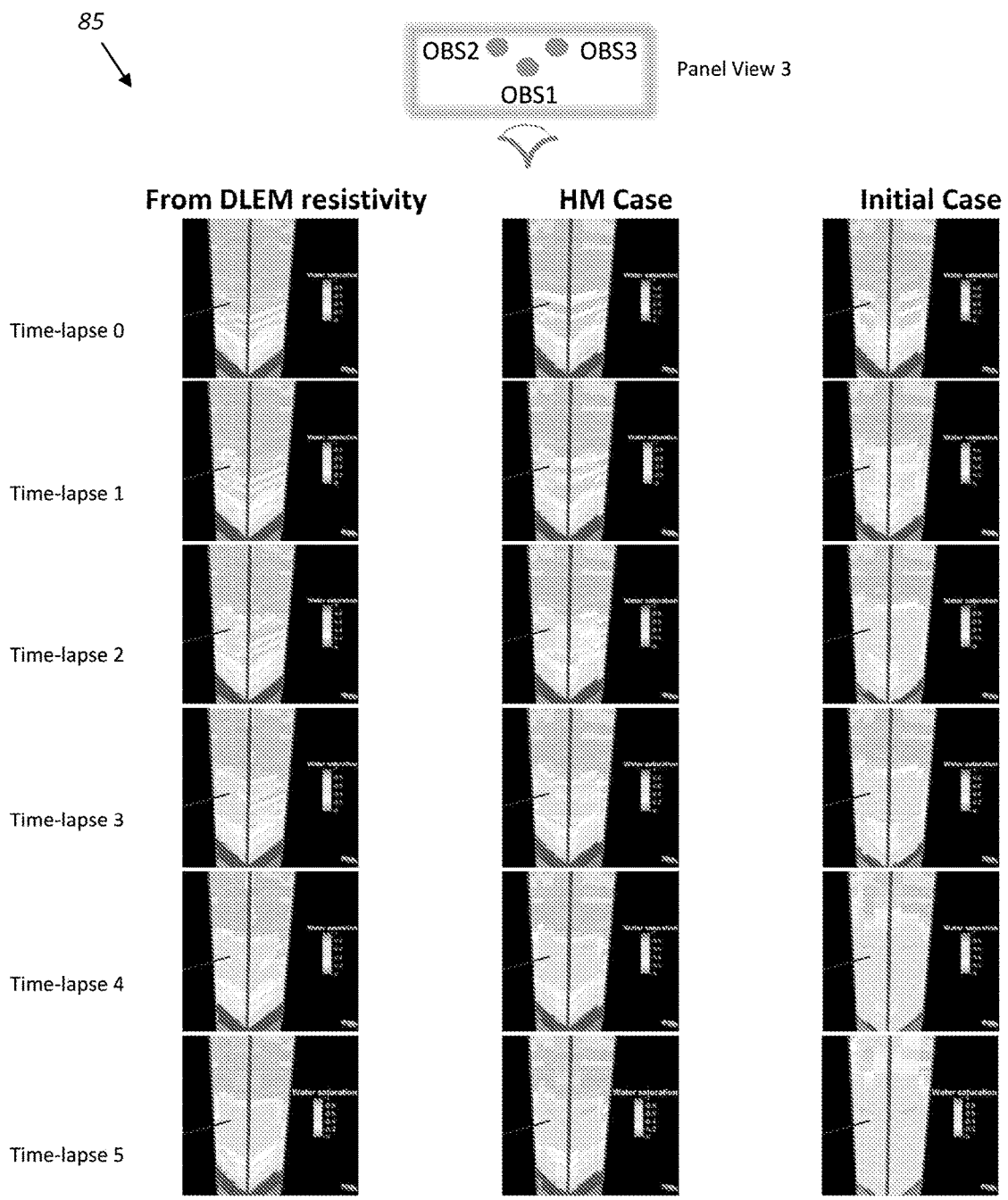

The history-match analysis of the best HM case obtained is now described. Time-lapse water saturation distribution in 3D was compared for water saturation derived from DeepLook-EM resistivity data, the HM case and the initial case. These were compared at a 10 m resolution. Three panels with three different orientations of the observation wells (OBS1-OBS3) are displayed in the series 83, 84, 85 of FIGS. 7-9. An agreeable match between DeepLook-EM water saturation and the HM case may be observed in these figures. Along the three observation wells, water saturation movement with time was also captured. A good match of water saturation movement in time-lapse manner was again achieved.

Examination was also made with respect to flow rate, pressure, gas-oil ratio (GOR) and watercut for the wells in the focus area. The pressure match for both of the HM cases was satisfactory for the observation wells and the water injection well. The production well PROD1 pressure match has been improved in the HM case using DeepLook-EM data. However, the pressure for production well is affected due to the proximity of this well towards the sector boundary. Rates, gas-oil ratio and watercut match for the production well PROD1 and the injection rate for the water injection well WINJ1 reveal that the HM case using DeepLook-EM data results in an improved match.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A method for geological formation analysis comprising:
    collecting measured data of a geological formation including an enhanced oil recovery (EOR) injection that occurs in the geological formation in a measurement time period, wherein collecting measured data of the geological formation comprises:
        collecting time-lapsed well-based measurement data from a first borehole in the geological formation over the measurement time period using an electromagnetic downhole tool placed in the first borehole; and
        collecting time-lapsed electromagnetic cross-well measurement data via a plurality of spaced-apart second boreholes in the geological formation over the measurement time period using a plurality of electromagnetic downhole tools placed in the plurality of spaced-apart second boreholes;
    simulating, by a processor, using historical data of a full-field geological model of the geological formation, a simulated change to a hydrocarbon resource in the geological formation over at least the measurement time period, wherein the historical data is of the full-field geological model, wherein the historical data of the full-field geological model is based at least in part on at least one of the following:
        a porosity of the geological formation;
        a permeability of the geological formation;
        a mineralogy of the geological formation;
        a rock property of the geological formation;
        seismic data;
    performing, by the processor, history matching to the historical data from the full-field geological model to improve a predictability of the full-field geological model in the geological formation, at least by:
        comparing the simulated change to the hydrocarbon resource due at least in part to the EOR injection based on the historical data of the full-field geological model to a measured change to the hydrocarbon resource due at least in part to the EOR injection as indicated based on both the time-lapsed well-based measurement data and the time-lapsed cross-well measurement data to account for both near field and full field changes in the geological formation; and
        updating the historical data in the full-field geological model to reduce a difference between simulated changes and measured changes in a subsequent simulation in response to detecting a difference between the simulated changes based on the historical data due at least in part to the EOR injection and the measured change due at least in part to the EOR injection is not within an error threshold; and
    predicting at least a property of the geological formation based on the updated full-field geological model.

2. The method of claim 1 further comprising scaling at least one of the time-lapsed well-based measurement data and the time-lapsed EM cross-well measurement data to a common measurement scale.

3. The method of claim 1 wherein the EOR injection comprises at least one of a water injection, a carbon dioxide injection, and a polymer injection.

4. The method of claim 1, wherein the property of the formation comprises a fluid distribution of the geological formation.

5. The method of claim 1, wherein the property of the formation comprises flow paths, barriers, lateral transmissibility, vertical transmissibility, or a combination thereof.

6. The method of claim 1, wherein predicting at least a property of the geological formation predicts fluid issues, wherein the fluid issues comprise water breakthrough.

7. A system for geological formation analysis comprising:
    a plurality of electromagnetic borehole tools to collect measured data of a geological formation including an enhanced oil recovery (EOR) injection in the geological formation in a measurement time period, the measured data comprising:
        time-lapsed well-based measurement data from a first borehole in the geological formation over the measurement time period; and
        time-lapsed electromagnetic cross-well measurement data via a plurality of spaced-apart second boreholes in the geological formation over the measurement time period;
        wherein the time-lapsed well-based measurement data and the time-lapsed electromagnetic cross-well measurement data are stored into a memory device, a storage device, or both; and
    a computer disposed at a surface, wherein the computer comprises a processor and the memory device, the storage device, or both, wherein the memory device, the storage device, or both comprise processor-executable instructions stored therein to cause the processor to:
        simulate, using historical data of a full-field geological model of the geological formation, a simulated change to a hydrocarbon resource in the geological formation at least over the measurement time period, wherein the historical data is of the full-field geological model, wherein the historical data of the full-field geological model is based at least in part on at least one of the following:
a porosity of the geological formation;
a permeability of the geological formation;
a mineralogy of the geological formation;
a rock property of the geological formation;
seismic data;
perform history matching to the historical data of the full-field geological model to improve a predictability of the full-field geological model in the geological formation, at least by:
comparing the simulated change to the hydrocarbon resource due at least in part to the EOR injection that was simulated over a historical period based on the historical data of the full-field geological model to a measured change to the hydrocarbon resource due at least in part to the EOR injection as indicated based on both the time-lapsed well-based measurement data and the time-lapsed electromagnetic cross-well measurement data to account for both near field and full field changes in the geological formation; and
updating the historical data in the full-field geological model to reduce a difference between simulated changes and measured changes in a subsequent simulation in response to determining a difference between the simulated change based on the historical data due at least in part to the EOR injection and the measured change due at least in part to the EOR injection is not within an error threshold; and
predict at least a property of the geological formation based on the updated full-field geological model.

8. The system of claim 7 wherein said processor further scales at least one of the time-lapsed well-based measurement data and the time-lapsed electromagnetic cross-well measurement data to a common measurement scale.

9. The system of claim 7 wherein the EOR injection comprises at least one of a water injection, a carbon dioxide injection, and a polymer injection.

10. A tangible, non-transitory computer-readable medium having computer-executable instructions to cause a computer to:
receive into the computer measured data of a geological formation including an enhanced oil recovery (EOR) injection in the geological formation in a measurement time period, comprising instructions to:
receive into the computer, wherein the computer comprises a processor and memory or storage, time-lapsed well-based measurement data obtained from a first borehole in the geological formation over the measurement time period by an electromagnetic downhole tool placed in the first borehole; and
receive into the computer time-lapsed cross-well electromagnetic measurement data obtained via a plurality of spaced-apart second boreholes in the geological formation over the measurement time period by a plurality of electromagnetic downhole tools placed in the plurality of spaced-apart second boreholes;
simulate, using historical data of a full-field geological model of the geological formation, a simulated change to a hydrocarbon resource in the geological formation over at least the measurement time period, wherein the historical data is of the full-field geological model and is based at least in part on at least one of the following:
a porosity of the geological formation;
a permeability of the geological formation;
a mineralogy of the geological formation;
a rock property of the geological formation;
seismic data;
perform history matching to the historical data of the full-field geological model to improve a predictability of the full-field geological model in the geological formation, at least by:
comparing the simulated change to the hydrocarbon resource due at least in part to the EOR injection that was simulated over the historical period based on the historical data of the full-field geological model to a measured change to the hydrocarbon resource due at least in part to the EOR injection as indicated based on both the time-lapsed well-based measurement data and the time-lapsed electromagnetic cross-well measurement data to account for both near field and full field changes in the geological formation; and
updating the historical data in the full-field geological model to reduce a difference between simulated changes and measured changes in a subsequent simulation in response to a difference between the simulated change based on the historical data due at least in part to the EOR injection and the measured change due at least in part to the EOR injection is not within an error threshold; and
predict at least a property of the geological formation based on the updated full-field geological model.

11. The non-transitory computer-readable medium of claim 10 further having computer-executable instructions for causing the computer to scale at least one of the time-lapsed well-based measurement data and the time-lapsed electromagnetic cross-well measurement data to a common measurement scale.

12. The non-transitory computer-readable medium of claim 10 wherein the simulated change to the hydrocarbon resource in the geological formation over the measurement time period is based, at least in part, upon a simulated enhanced oil recovery (EOR) injection in the geological formation and the full-field geological model.

* * * * *